United States Patent [19]

Tong et al.

[11] Patent Number: 5,384,685
[45] Date of Patent: Jan. 24, 1995

[54] SCREEN PRINTING OF MICROPROTRUSIONS FOR USE AS A SPACE SEPARATOR IN AN ELECTRICAL STORAGE DEVICE

[75] Inventors: Robert Tong, Sunnyvale; James M. Poplett, Cupertino; Mark L. Goodwin, Santa Cruz, all of Calif.; Ronald L. Anderson, Lino Lakes; James P. Nelson, Shoreview, both of Minn.

[73] Assignee: Pinnacle Research Institute, Inc., Los Gatos, Calif.

[21] Appl. No.: 947,414

[22] Filed: Sep. 18, 1992

Related U.S. Application Data

[63] Continuation-in-part of Ser. No. 947,294, Sep. 18, 1992.

[51] Int. Cl.⁶ .......................... H01G 9/02; B05D 5/12
[52] U.S. Cl. .................................. 361/503; 29/25.03; 427/80; 427/282
[58] Field of Search ................. 427/79, 80, 81, 282; 101/129; 29/25.03, 623.5; 361/503, 508, 512, 532, 534

[56] References Cited

U.S. PATENT DOCUMENTS

| | | |
|---|---|---|
| 3,288,641 | 11/1966 | Rightmire . |
| 3,536,963 | 10/1970 | Boos ........................... 317/230 |
| 3,562,008 | 2/1971 | Martinsons et al. . |
| 3,718,551 | 2/1973 | Martinsons .................. 204/290 F |
| 4,052,271 | 10/1977 | Beer ............................ 204/181.5 |
| 4,198,476 | 4/1980 | DiSalvo, Jr. et al. ......... 429/194 |
| 4,548,880 | 10/1985 | Suzuki et al. ................ 429/162 |
| 4,555,745 | 11/1985 | Westermeier et al. ....... 427/98 |
| 4,557,983 | 12/1985 | Sauer ........................... 429/27 |
| 4,572,843 | 2/1986 | Saito et al. .................. 427/79 |
| 4,663,824 | 5/1987 | Kenmochi .................. 29/570 |
| 4,733,328 | 3/1988 | Blazej .......................... 361/320 |
| 4,800,142 | 1/1989 | Bish et al. .................... 429/130 |
| 4,816,356 | 3/1989 | Balkanski ................... 429/191 |
| 4,862,328 | 8/1989 | Morimoto et al. .......... 361/502 |
| 5,032,426 | 7/1991 | Sumner, Jr. .................. 427/96 |
| 5,055,169 | 10/1991 | Hock, Jr. et al. ............. 427/531 |
| 5,062,025 | 10/1991 | Verhoeven et al. .......... 361/509 |
| 5,063,340 | 11/1991 | Kalenowsky ................. 320/1 |
| 5,072,335 | 12/1991 | Kurabayashi et al. ........ 361/502 |
| 5,085,955 | 2/1992 | Cipriano ...................... 429/197 |
| 5,116,695 | 5/1992 | Rao et al. .................... 429/12 |
| 5,116,701 | 5/1992 | Kalisz .......................... 429/130 |
| 5,121,288 | 6/1992 | Metroka et al. ............. 361/329 |
| 5,141,828 | 8/1992 | Bennion et al. .............. 429/210 |
| 5,148,355 | 9/1992 | Lowe et al. ................... 361/410 |
| 5,268,006 | 12/1993 | Ueno et al. ................... 29/25.03 |

FOREIGN PATENT DOCUMENTS

1196683 11/1985 Canada .
44427 1/1982 European Pat. Off. .
2044535 10/1980 United Kingdom .

OTHER PUBLICATIONS

Sanada, K. et al., "Improvement on Self-Discharge Characteristic of an Electric Double Layer Capacitor", IEEE, ch. 1818-4 (1982), pp. 224-230.

B. E. Conway, *J. Electrochem. Soc.*, vol. 138 (#6), p. 1539, (Jun. 1991).

(List continued on next page.)

*Primary Examiner*—Terry J. Owens
*Attorney, Agent, or Firm*—Phillips Moore Lempio & Finley

[57] ABSTRACT

Electrodes of an electrical charge storage device are separated by forming on the surfaces of the electrodes arrays of substantially uniform electrically insulating microprotrusions made preferably of an organic epoxide polymer. The electrodes are thin, flat electrically conducting metal sheets coated on one or both flat surfaces with electrically conducting porous carbon or a porous metal oxide. The microprotrusions are applied to the coated electrodes through a stencil by screen printing and essentially retain their shape and dimensions after curing.

20 Claims, 3 Drawing Sheets

OTHER PUBLICATIONS

H. Lee, et al., *IEEE Transactions on Magnetics*, vol. 25 (#1), p. 324, (Jan. 1989).

G. Bullard, et al., *IEEE Transactions on Magnetics*, vol. 25 (#1) p. 102, (Jan. 1989).

A. Yoshida et al., *IEEE Transactions on Components, Hybrids and Manufacturing Technology*, "An Electric Double-Layer Capacitor with Activated Carbon Fiber Electrodes", vol. CHMT-10, #1, P-100-103, (Mar. 1987).

T. Suzuki, et al., *NEC Research and Development*, "Improved Self Discharge Characteristics of the Electric Double Layer Capacitor", No. 82, pp. 118-123, Jul. 1986.

S. Sekido, *Solid State Ionics*, vol. 9, 10, pp. 777-782, (1983).

R. S. Yeo et al., in *J. Electrochem. Soc. Electrochemical Science and Technology*, vol. 128, No. 9, pp. 1900-1904, Sep. 1981.

R. S. Yeo et al., in *Abstracts of meeting of The Electrochemical Society*, Oct. 14-19, 1979, Abstract No. 652, p. 1637, published 1979.

L. D. Burke et al., in *J. Electroanal. Chem.* 112, (1980), pp. 39-50.

D. Galizzioli et al., in *Journal of Applied Electrochemistry*, vol. 4, (1974), pp. 57-67.

D. Galizzioli et al., in *Journal of Applied Electrochemistry*, vol. 5, (1975), pp. 203-214.

S. Trasatti et al, in *J. Electroanal. Chem.*, vol. 29, (1971), App. 1-5.

S. Hadzi-Jordanov et al., in *J. Electrochem. Soc. Electrochemical Science and Technology*, Sep. 1978, pp. 1471-1480.

S. H. Glarum et al., in *J. Electrochem. Soc. Electrochemical Science and Technology*, Jul. 1980, pp. 1467-1474.

B. E. Conway et al., in *Trans. Faraday Soc.*, (1962), vol. 58, pp. 2493-2509.

M. Pham-Thi et al., the *Journal of Materials Science Letters*, vol. 5, p. 415, (1986).

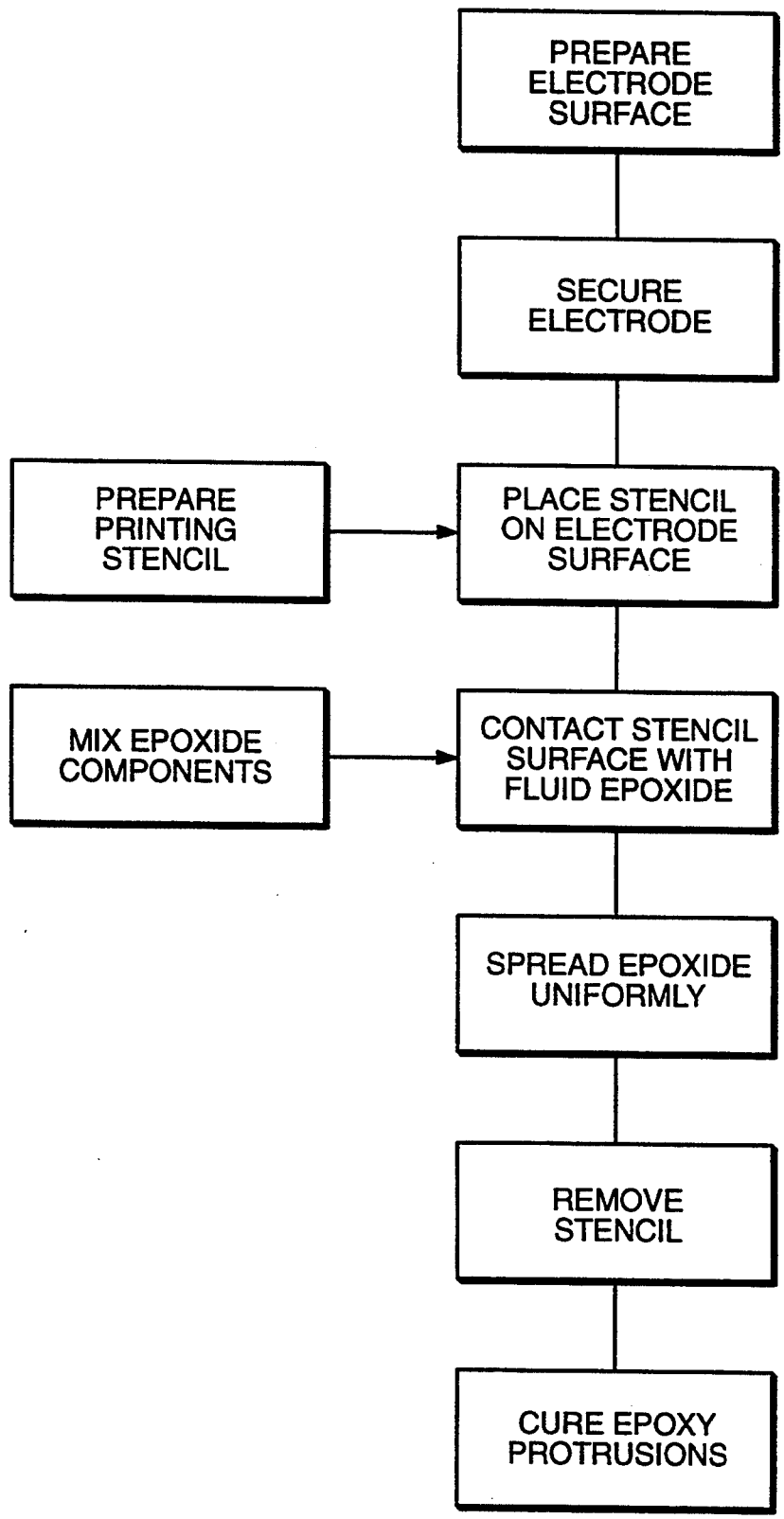
FIG._1

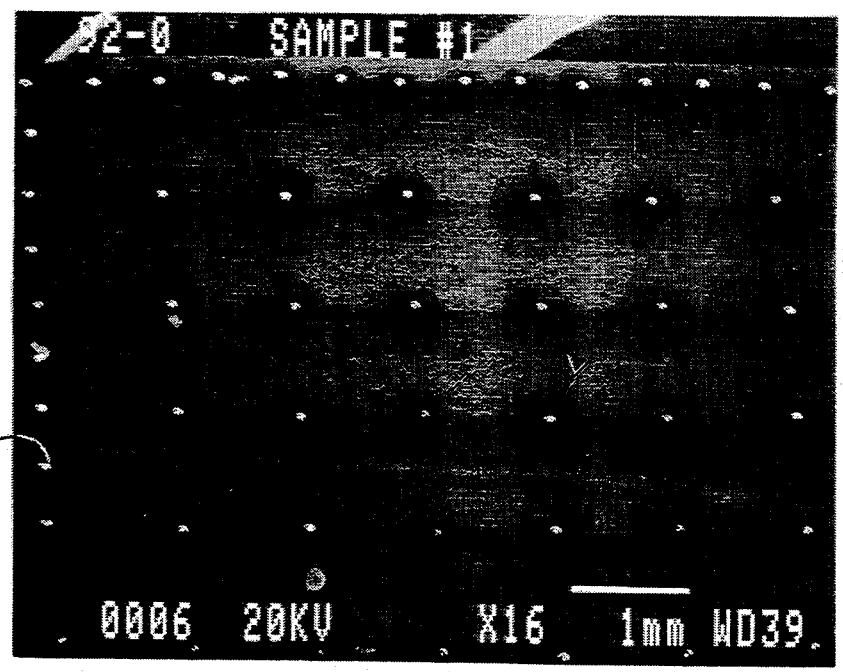
*FIG._2*
*FIG._3*

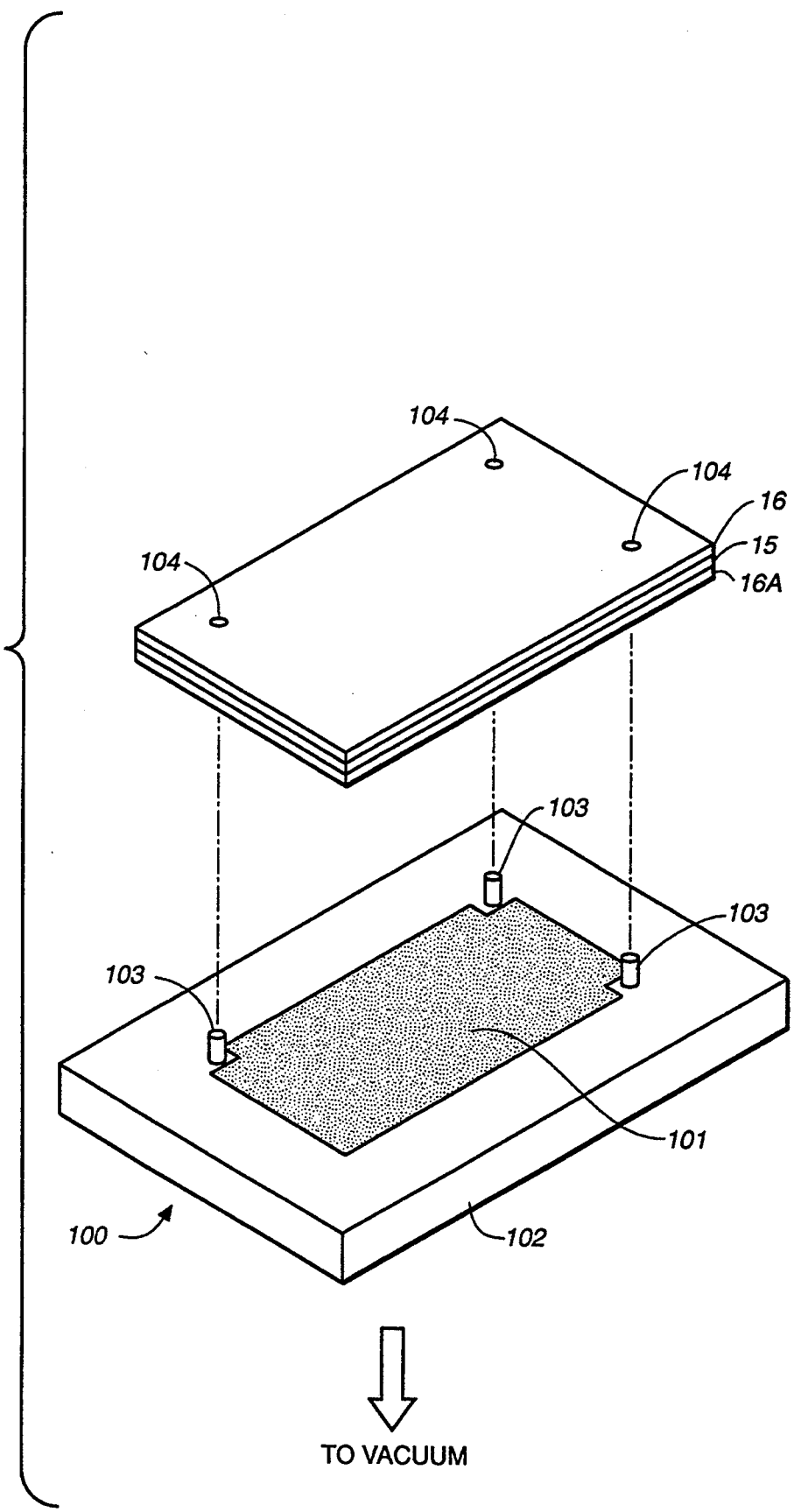
FIG._4

SCREEN PRINTING OF MICROPROTRUSIONS FOR USE AS A SPACE SEPARATOR IN AN ELECTRICAL STORAGE DEVICE

BACKGROUND OF THE INVENTION

The present application is a continuation-in-part of U.S. application Ser. No. 07/947,294, filed Sep. 18, 1992, which is incorporated by reference in its entirety. This application is commonly assigned.

FIELD OF INVENTION

The present invention relates to a method to produce an electrically insulating space separator between two electrically conducting surfaces by screen printing microprotrusions e.g. epoxy, onto a substrate. This method produces multiple micro-sized standoffs (protrusions) useful in electronic devices to maintain small uniform electrode separations with large (greater than 90%) open cross-sectional area.

BACKGROUND ART AND RELATED ART DISCLOSURES

There has been significant research over the years regarding electrical storage devices of high energy and power density. The efficient packaging of the active materials, with minimum wasted volume, is important in reaching these goals. The space separating two electrodes in a capacitor or a battery is necessary to electronically insulate the two electrodes. However, for efficient packaging, this space or gap should be a minimum. It would therefore by highly desirable to have a method to create a space separator or gap that is substantially uniform and of small dimension (less than 5 mil).

A common way to maintain separation between electrodes in an electrical storage device with an electrolyte present (such as a battery or capacitor) is by use of an ion permeable electrically insulating porous membrane. This membrane is commonly placed between the electrodes and maintains the required space separation between the two electrodes. Porous separator material, such as paper, glass, is useful for this application and is used in aluminum electrolytic and double layer capacitors. However, for dimensions below 1 or 2 mil in separation, material handling is difficult and material strength of the capacitor is usually very low. In addition, the open crosssectional areas typical of these porous membrane separators are on the order of 50–70%.

Polymeric ion permeable porous separators have been used in carbon double layer capacitors as discussed by Sanada et al. in IEEE, pp. 224–230, 1982 and Suzuki et al. in *NEC Research and Development*, No. 82, pp. 118–123, July 1986. These type of separators suffer from the problem of a small open area which leads to increased electrical resistance.

U.S. patents of general interest include U.S. Pat. Nos. 3,718,551; 4,052,271; and 5,055,169.

None of these references individually or collectively teach or suggest the present invention.

All of the applications, patents, articles, references, and standards cited in this application are incorporated herein by reference in their entirety.

It would be very useful to have a method to produce a reliable small space separation between electrodes in electrical storage devices with a large open crosssectional area. It is, therefore, an object of the present invention to provide efficient packaging of an electrical storage device by reducing the gap between the anode and cathode and to reduce the electrical resistance of the ionically conducting electrolyte by providing large open cross-sectional areas of about 95–98%.

SUMMARY OF THE INVENTION

In one aspect, the present invention relates to a method to produce microprotrusions on a substrate to maintain space separation, which method comprises:

(a) combining an electrical insulating polymeric material which is essentially inert to subsequent electrolyte conditions to produce a flowable composition at the processing temperatures;

(b) obtaining a thin electrode material comprising a thin flat electrically conducting metal sheet center coated on one or both sides with electrically conducting carbon or a porous metal oxide;

(c) placing a thin screen or stencil having small openings over the flat thin electrode;

(d) contacting the top exterior side of the thin screen surface with the flowable composition of step (a) so that small portions of the composition independently of each other extrude through the pattern and contact the exterior surface of the thin electrode and optionally penetrate the exterior surface of the layer, when a pressure bar is brought across the screen surface to cause contact of the screen with the electrode surface;

(e) removing the sample from the screen printer; and (f) curing the applied insulating polymeric material whereby the microprotrusions essentially retain their shape and dimensions.

Preferably, the insulator material is an organic epoxy polymer.

BRIEF DESCRIPTION OF DRAWINGS

FIG. 1 is a schematic representation of the method to produce the microprotrusions of the present invention.

FIG. 2 is a scanning electron micrograph of the surface of the electrode showing the microprotrusion pattern at 16 power.

FIG. 3 is a scanning electron micrograph at an angle view of the surface of the electrode showing the micro protrusion at 65 power.

FIG. 4 is a schematic representation of a holder for an electrode component prior to screen printing.

DETAILED DESCRIPTION OF THE INVENTION

Definitions

As used herein:

"Cab-O-Sil®" refers to silica filler available from Cabot Corporation of Tuscola, Ill. A variety of sizes are available.

"Electrically conducting support material" or "electrode substrate" refers to any electrically conducting metal or metal alloy, electrically conducting polymer, electrically conducting ceramic, electrically conducting glass, or combinations thereof. Metals and metal alloys are preferred for producing stack units. The support material should have a conductivity of greater than about $10^{-4}$ S/cm.

"Epoxy" refers to the conventional definition of the product which is an epoxy resin mixed with a specific curing agent, usually, i.e., a polyepoxide mixed with a polyamine curing agent.

MYLAR® refers to a polyester of polyethylene terephthalate of DuPont, Inc. of Wilmington, Del. It is usually available in sheet form of varying thicknesses.

"Metal oxide" refers to any electrically conducting metal oxide.

"Mixed metal oxide" refers to an electrically conducting oxide compound of two or more metal oxides.

The focus of the present invention is to produce a series of microprotrusions on the surface of an electrode to act as a space separator in an electrical storage device such as a capacitor or a battery.

The electrode substrate is usually a thin metal such as titanium, zirconium, or alloys thereof. The substrate is usually in the shape of a thin metal plate as is conventional in the capacitor art.

The substrate is then coated on one or both sides with a carbon compound or a porous oxide coating selected from titanium, ruthenium, tantalum, iridium, or mixtures thereof. This step is accomplished by methods conventional in the art. The oxide coating serves as the charge storage area for the device.

Alternately, a stacked set of battery electrodes (e.g., lead for lead acid) or electrolytic capacitor electrodes (e.g., alumina and tantalum) may be fabricated.

It is important that the flat surfaces of adjacent coated substrates do not contact each other and further be of a uniform separation.

With regard to FIGS. 1, 2, 3 and 4, the epoxy microprotrusions accomplish the desired uniform separation.

Sample Holding—The coated thin flat electrode 16, 15, 16A needs to be secured (or held) so that the formation of the microprotrusions is precise and accurate on the flat surface. For thin metal sheets (0.1 to 5 mil., especially about 1 mil) the holder is particularly important. If a strong vacuum is pulled on a thin sheet, often reverse dimples are formed in the thin sheet which cause significant undesirable changes in the physical and electrical properties of the final device.

The porous ceramic holder 101 is useful because the pore size is small enough that the dimples do not appear when a mild or stronger vacuum is pulled. The flat ceramic surface must be in intimate contact with electrode surface under conditions which do not deform the metal or disrupt the coating present. The vacuum used with the porous ceramic is at least 25 in mercury. Preferably the vacuum is between about 25 and 30, especially 26 and 29 in.

Further, the ceramic substrate needs to be flush with the surface of any mechanical holder to assure that uniform extrusion of the epoxy through the openings occurs. Flush in this context means that the flat surface of the holder and the surface of the coating for electrical storage differ from each other by between about ±5 mil deviation or less from level per 6 linear in.

The metal frame 102 and ceramic should be as flush (flat) as possible so that uniformly sized protrusions are formed from one end of the electrode to the other.

The holder for the sample can be purchased from a number of commercial sources for example from Ceramicon Designs, Golden, Colo. Alternatively, the sample holder 101 can be manufactured using commercially available metals, alloys or ceramics.

Usually a 5 in. by 7 in. coated sheet electrode of 16, 15, 16A is formed.

The metal holder 102 has three strategically located pins 103 which are used to align and position the electrode using the corresponding holes 104. Holes 104 are usually as close to the edges of the electrode as possible to conserve useful electrode surface.

The stencil having the desired open pattern is stretched and secured in a conventional screen printing frame. The screen mesh is removed.

The epoxy components are mixed and the fluid epoxy is placed on the surface of the stencil, then spread to obtain an even applied coat. This can be accomplished using a pressure bar, doctor bar or a squeegee.

Usually constant temperature and humidity are important to obtain an even coat.

The stencil is then carefully removed leaving the fluid epoxy protrusions on the surface of the oxide. The epoxide protrusions are then cured using ambient or accelerated heat at from between 100° to 150° C.

This electrode having microprotrusions is then combined with others assembled in a wet process or a dry process. If a dry process is used, the dry unit is then back filled with electrolyte.

It is important that the cured epoxy does not react with the liquid electrolyte eventually used in the fabrication of the capacitor having multiple layers of electrodes.

The cured microprotrusions then perform their function by keeping the spacing between the electrodes uniform.

As can be seen from FIGS. 2 and 3 the edges of the flat surface of the electrode have protrusions that are closer together than those protrusions in the active portion of the electrode. These protrusions increase their support at the edges to maintain uniform separations.

It is apparent that from these teachings the following are possible:

Increasing or decreasing the substrate electrode thickness will allow a increase or decrease in the microprotrusion spacing due to changes in support requirements.

Other epoxies or epoxy derivatives can be used.

Other microprotrusion pattern elements can be used such as squares, lines, crosses, etc.

Optionally the screen may be heated, if necessary to bring the resin flowable epoxy to a temperature when its viscosity becomes suitable for printing for a short time. In one embodiment, the screen, mask or stencil is heated to between 25° and 95° C. in step (d).

This heating step followed by screen printing of the flowable epoxy resin must be performed quickly because the working time for the epoxy is significantly reduced.

UTILITY

The electrical storage devices produced having the claimed micro-protusions are useful as batteries, capacitors and the like.

The capacitors are useful for example in defibrillators, pacemakers, electric vehicles, portable telephones and the like.

The electrode having the microprotrusions in usually cut to the desired dimensions. Certainly even layered coated electrodes having microprotrusions can be produced. The coated electrode having microprotrusions produced herein is used for example in the co-filed U.S. patent application Ser. No. 07/947,294.

The following examples are provided to be descriptive and explanatory only. They are not to be construed to be limiting in any way.

EXAMPLE 1

Application of Epoxy Microprotrusions by Screen Printing to a Porous Coating on a Thin Substrate (A) Screen Preparation—A 325 mesh stainless steel screen is stretched on a standard screen printing frame. To this screen is edge glued (Dexter EPOXY 608 clear) a smaller 1–1.5 mil thick brass sheet which has holes (6.3 mil diameter) drilled or etched to the desired pattern. The screen mesh is removed from the area covered by the brass sheet leaving the brass sheet edge glued to the screen mesh attached to the frame.

(B) Sample Holding—A vacuum is pulled on a porous alumina holding plate of 10 $\mu$m average pore diameter is used to hold the 1 mil thick porous oxide coated material during the printing.

(C) Epoxy—A two component epoxy Master Bond EP21AR is modified to the desired viscosity (thixotropic, 300,000 to 400,000 cps) by the addition of a silica filler. The filled epoxy having the desired viscosity is available by purchase order from Master Bond, Inc. of Hackensack, N.J. The epoxy is prepared as per instructions. The useful lifetime as a flowable fluid is about 30 min.

| squeegee speed: | 1–2 in/s |
|---|---|
| snap off: | 20–30 mil |

Constant temperature and humidity of the epoxy are important to assure an even applied coat. Typical conditions are about 40–70% relative humidity and a temperature of about 20°–25° C.

(E) Printed epoxy pattern—An array of epoxy bumps essentially 1 mil in height and about 7.5 mil in diameter are produced. A typical pattern on an electrode consists of an array of microprotrusions deposited on 40 mil center-to-center spacing. In addition, the density of microprotrusions at the perimeter of the electrode is increased by decreasing their center-to-center spacing to 20 mil. The screen printed epoxy configuration is cured at 150° C for a minimum of four hours.

EXAMPLE 2

Formation of Epoxy Microprotrusion (A) Screen Preparation—A 230 or 325 mesh screen (8×10 in stainless steel) without an emulsion on the surface, mounted on a standard printing frame, is used as the base piece. An etched, drilled or punched stencil (6.0×8.5 molybdenum) is edge glued using Dexter EPOXY 608 Clear from Dexter located to the back side of the screen. MYLAR ® is placed over the stencil-screen unit and pressure applied to smooth the epoxy into a uniform layer. The screen is then flipped, epoxy applied to the top side of the screen, a MYLAR ® sheet placed over the area and the epoxy smoothed. The MYLAR ® sheet on the top side of the screen is then removed. The screen-stencil assembly is then placed into a 120° C. oven with ambient atmosphere for 5 min to cure the epoxy. Alternatively, the epoxy can be cured by setting at ambient temperature for 30–60 min. After removal of the screen-stencil from the oven, the MYLAR ® on the back side is peeled away immediately. The mesh screen on the top side is then cut away using a sharp edge, with care being taken to prevent cutting of the stencil. Upon removal of the mesh over the stencil pattern, epoxy is applied to the cut mesh-stencil perimeter, covered with MYLAR ®, and the epoxy smoothed to ensure edge attachment of the screen to the stencil. The epoxy is cured in the oven for 5 minutes. The resulting item is a stencil stretched taut by the screen, ready for printing.

(B) Sample Holding—A porous ceramic holding (e.g. FIG. 4) plate (Ceramicon Designs, Golden, Colo., material) of 4.5–6$\mu$ pore diameter with a porosity of 36.5% (30–60% porosity would be acceptable) is used to hold the 1 mil thick porous oxide coated material during the printing by pulling a vacuum through the porous ceramic plate. The ceramic plate is cut to the appropriate dimensions (the size and shape of the substrate to be printed). This ceramic plate then is inserted into an aluminum (steel, etc) frame 102 and epoxy (or other adhesive) that can be mounted to a screen printer. The ceramic plate is then carefully ground flush to the metal frame as flat as possible. Locating pins 103 then are added to hold the substrate of 16, 15, 16A in appropriate location using holes 104.

(C) Epoxy—The Master Bond EP 21 ART ® (a two component epoxy (of polyamine hardener, 33 weight percent and a liquid epoxy resin, 67 weight percent) with a viscosity of about 150,000 to 600,000 cps). The epoxy is prepared as per the product instructions. The useful lifetime as a flowable fluid is about 30 min.

| Squeegee Speed | 1–2 in/s (depends upon epoxy viscosity) |
|---|---|
| Snap Off | 20–30 mil (Related to screen tension; and adjusted accordingly) |

(E) Printed epoxy pattern—An array of epoxy bumps essentially about 1 to 1.25 mil in height and about 7.5 mil in diameter are produced. A typical pattern on an electrode consists of an array of microprotrusions deposited on 40 mil center-to-center spacing. In addition, the density of microprotrusions around the perimeter of the electrode is increased by decreasing their center-to-center spacing to 20 mil. The screen printed epoxy configuration is cured at 150° C. for 4 to 12 hr in an ambient atmosphere. See FIG. 2 and 3 for the microprotrusion coated electrode.

While only a few embodiments of the invention have been shown and described herein, it will become apparent to those skilled in the art that various modifications and changes can be made in the formation and applications of microprotrusions to provide substantially uniform spacing between electrodes of an electrical storage device without departing from the spirit and scope of the present invention. All such modifications and changes coming within the scope of the appended claims are intended to be carried out thereby.

What is claimed is:

1. A method of producing an array of substantially uniform electrically insulating microprotrusions on an electrode surface as a separator of electrodes of an electrical charge storage device, which method comprises:
   (a) obtaining an electrically insulating material which is essentially inert to electrolyte conditions which material has thixotropic properties at ambient temperature and pressure;
   (b) obtaining an electrode material comprising a thin flat electrically conducting metal sheet the center of which is coated on one or both flat surfaces with electrically conducting porous carbon or a porous metal oxide creating a coated flat electrode and securing the coated flat electrode in a holder;

(c) placing a stencil having openings over the coated flat electrode;

(d) contacting the top exterior stencil surface with the thixotropic material of step(a) so that portions of the material extrude through the stencil and contact the exterior surface of the coated electrode thus creating multiple discrete microprotrusions when a squeegee is brought across the top exterior stencil surface to cause contact of the bottom of the stencil with the coated electrode surface and the stencil is removed;

(e) removing the coated electrode produced in step (d) from the holder; and (f) curing the applied multiple discrete microprotrusions whereby the microprotrusions essentially retain their shape and dimensions.

2. The method of claim 1 wherein the device is a capacitor or a battery.

3. The method of claim 1 wherein the thin flat electrode material has an electrically conducting porous surface area exterior coating of carbon particles, metal oxide or mixed metal oxide.

4. The method of claim 3 wherein the electrically conducting porous surface area exterior coating of the electrode comprises carbon.

5. The method of claim 3 wherein the electrically conducting porous surface area exterior coating of the electrode comprises a metal oxide or a mixed metal oxide.

6. The method of claim 1 wherein the holder is a porous substrate holding plate used to hold the coated electrode by vacuum during steps (b), (c), (d), and (e).

7. The method of claim 1 wherein the electrically insulating material is an organic epoxy containing polymer.

8. The method of claim 7 wherein the epoxy composition further comprises a silica filler.

9. The method of claim 7 wherein the insulating material consists essentially of a polyamine hardener and a polyepoxide.

10. The method of claim 1 wherein in step (d) the stencil is heated between 25° and 95° C.

11. The method of claim 5 wherein the mixed metal oxide is selected from the group consisting of the oxides of ruthenium, titanium, tantalum, chromium, iridium and combinations thereof.

12. The method of claim 2 wherein
the flat electrode has an electrically conducting porous coating material selected from mixed metal oxides;
the electrode substrate is selected from titanium, zirconium, tantalum, or alloys thereof; and
the thixotropic material consists essentially of a polyepoxide and a polyamine.

13. The method of claim 1 wherein the conducting metal sheet comprises tantalum.

14. The method of claim 12 wherein, the electrically conducting metal sheet is tantalum.

15. The method of claim 12 wherein the mixed oxides are selected from the group consisting of the oxides of ruthenium, titanium, tantalum, chromium, iridium and combinations thereof.

16. The method of claim 12 wherein the microprotrusions comprise a polyemine hardener and a polyepoxide.

17. The method of claim 12 wherein the electrically conducting metal sheet is titanium.

18. The method of claim 12 wherein the electrically conducting metal sheet is zirconium.

19. The separator for the components of an electrical storage device produced by the method of claim 1, said separator consisting of an array of multiple microprotrusions on the porous coating surface of one or more flat electrodes.

20. The separator for the components of an electrical storage device produced by the method of claim 12, said separator consisting of an array of microprotrusions on the porous coating surface of one or more flat electrodes.

* * * * *